(12) United States Patent
Varadi et al.

(10) Patent No.: US 7,828,962 B2
(45) Date of Patent: Nov. 9, 2010

(54) APPARATUS FOR TREATING A WASTE STREAM

(75) Inventors: Tom Varadi, Houston, TX (US); Marie-Cecile Medine, Houston, TX (US); Arturo Ramon Puigbo, Pearland, TX (US); Ramiro G. Vazquez, Houston, TX (US)

(73) Assignee: Merichem Company, Houston, TX (US)

( * ) Notice: Subject to any disclaimer, the term of this patent is extended or adjusted under 35 U.S.C. 154(b) by 41 days.

(21) Appl. No.: 12/313,431

(22) Filed: Nov. 20, 2008

(65) Prior Publication Data
US 2010/0122950 A1 May 20, 2010

(51) Int. Cl.
*B01D 19/00* (2006.01)
*B01D 17/028* (2006.01)
*C02F 9/04* (2006.01)

(52) U.S. Cl. ............ 210/96.1; 210/188; 210/202; 210/205; 210/218; 210/219; 210/259; 210/260; 210/261; 210/262; 210/522; 96/202

(58) Field of Classification Search .......... 210/743, 210/749, 750, 752, 765, 188, 195.1, 197, 210/198.1, 199, 200, 201, 202, 205, 207, 210/209, 218, 219, 255, 259, 26, 261, 262, 210/96.1, 208, 708, 718, 800, 521, 522, 532.1, 210/537, DIG. 5; 422/149, 188, 234; 95/263, 95/265; 96/202; 23/306
See application file for complete search history.

(56) References Cited
U.S. PATENT DOCUMENTS
5,354,482 A * 10/1994 Varadi .............. 210/742

* cited by examiner

*Primary Examiner*—Matthew O Savage
*Assistant Examiner*—Lucas Stelling
(74) *Attorney, Agent, or Firm*—McDonnell Boehnen Hulbert & Berghoff LLP

(57) ABSTRACT

An integrated unit operations for the treatment of a waste stream, such as spent caustic, is provided in a single vertical vessel having at least three separate zones: a mixing, a settling, and a mass transfer zone.

8 Claims, 1 Drawing Sheet

APPARATUS FOR TREATING A WASTE STREAM

FIELD OF THE INVENTION

This invention relates to a new equipment design for treating spent waste streams, specifically spent caustic streams recovered in a petroleum refining or petrochemical processes. As opposed to prior treatment processes our invention is a deep neutralization or deep acidification process that use a number of separate vessels, our invention uses a single vertical column divided into at least three distinct zones; a mixing zone, a settling zone and a mass transfer zone.

BACKGROUND OF THE INVENTION

In petroleum refining and in petrochemical processing, hydrocarbon conversion products often are scrubbed with caustic solution. In petrochemical processing, for example, such scrubbing removes hydrogen sulfide and carbon dioxide primarily as sodium sulfide, sodium carbonate and sodium bicarbonate, and also removes some of the higher molecular weight hydrocarbon constituents. Caustic solution can be used to remove naphthenic acids and other organic acids, as well as other sulfur compounds from cracked petroleum products and petroleum distillate. However, because caustic solutions are quite harmful to organic tissue, extreme care must be taken in the use and disposal of the spent caustic solutions to protect waterways, rivers, subterranean water formations, and the like. Such spent caustic solutions often are unsuitable for direct treatment in biological wastewater treatment plants because of such factors as high pH and incompatibly high levels of biochemical oxygen demand (BOD), chemical oxygen demand (COD), and total organic carbon (TOC).

Several methods have been proposed to dispose of spent caustic. Among these are wet air oxidation, chemical oxidation, and incineration. In each of these known processes numerous pieces of equipment are needed to complete the treatment process. Such processes are capital intensive because of the number of separate process vessels involved. Likewise, such processes require a large footprint of real estate to accommodate the numerous separate pieces of equipment. Our invention has solved these problems by performing the treatment process in a single vertical column that is divided into at least three process zones. Such an apparatus and associated process represents an extremely economical method of treating waste streams, in particular spent caustic, and consequently, minimizing capital and operating costs. These and other advantages will become evident from the following more detailed description of the invention.

SUMMARY OF THE INVENTION

Our invention relates to an integrated treatment vessel for treating waste streams comprising, in combination, a vertical column having an interior divided into at least a mixing zone, a settling zone and a mass transfer zone. A waste stream inlet is connected to the column for introduction of the waste stream, such as spent caustic, to the mixing zone where it is mixed with a neutralizing agent, such as a strong acid like sulfuric acid. The neutralizing agent maybe added in-line directly to the waste stream and upstream of the inlet or added separately to the mixing zone. There is an off-gas outlet on the vessel that is in fluid communication with the mixing zone to vent $N_2$, $H_2S$, RSH, light hydrocarbons. An organic stream outlet in liquid communication with the settling zone is needed to remove separated acid oils, such as naphthenic acids, DSO, cresylic acids, and entrained hydrocarbon. Connecting the settling zone with the mass transfer zone is a liquid transfer line and connecting the mass transfer zone to the settling zone is a vapor line. An inert gas inlet is in fluid communication with the mass transfer zone in order to strip out the bulk of acid gases present. Finally, the treated waste is removed via an outlet that is in liquid communication with the bottom of the mass transfer zone.

Our invention is characterized in that it reduces capital cost by minimizing piping components, number of stand alone vessels, instrumentation and unit delivery time. These and other aspects of our invention will become more apparent from the detail description of the preferred embodiment contained below.

BRIEF DESCRIPTION OF THE DRAWINGS

The accompanying FIGURE schematically illustrates one possible embodiment of the waste stream apparatus of our invention.

DETAILED DESCRIPTION OF PREFERRED EMBODIMENTS

Figure 1:
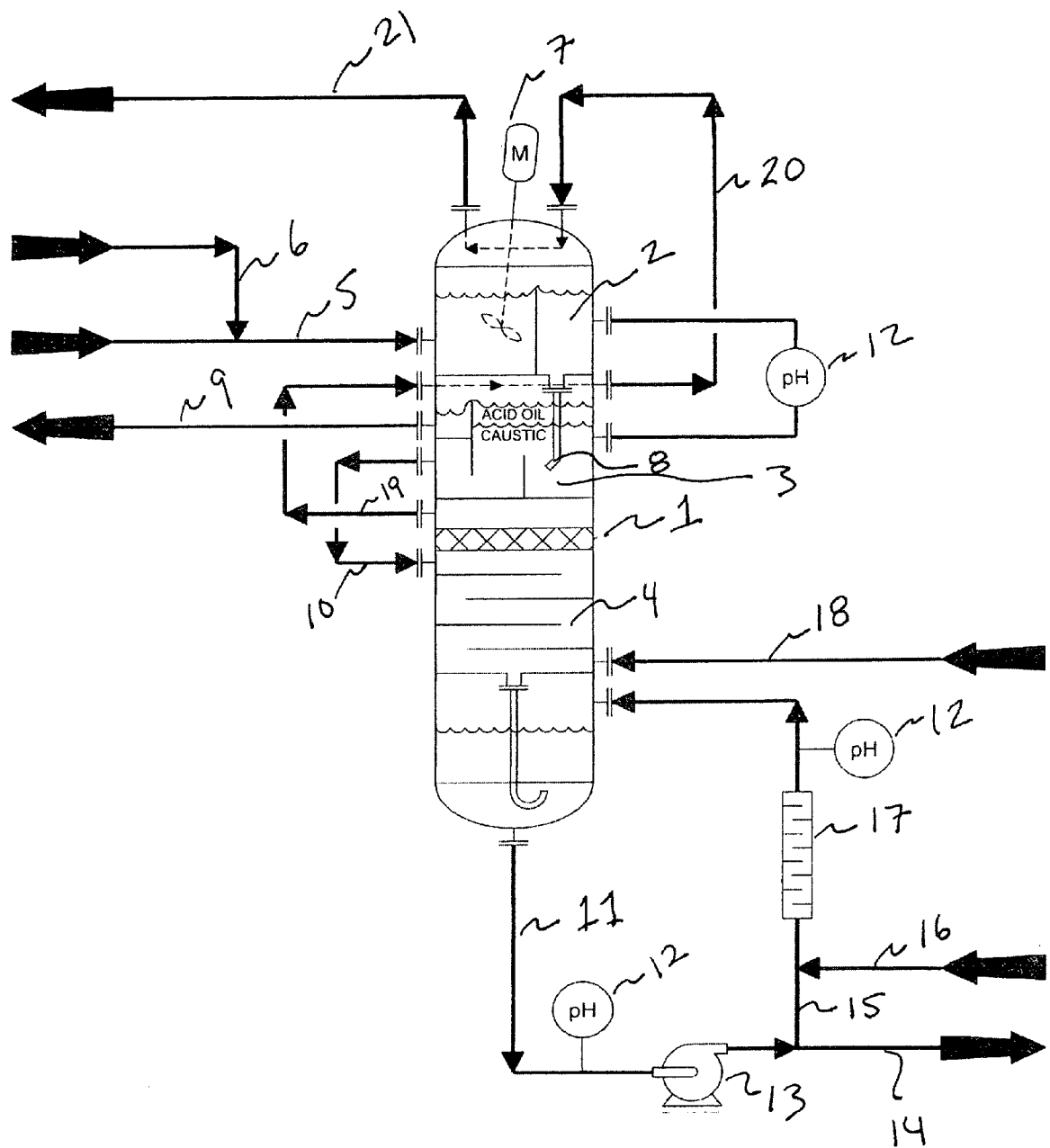

As stated, our invention is directed to a single apparatus that is used for the treatment of a waste stream, preferably the neutralization of spent caustic. One embodiment of that apparatus is illustrated in the accompanying FIGURE.

The FIGURE shows a vertical column or vessel 1 having at least three separate process zones. Zone 2 is a mixing zone where the waste stream to be treated is thoroughly mixed with a neutralization agent. As mentioned, a preferred process for use in our invention is to treat or neutralize spent caustic from one or more refining or petrochemical processes. The following description of this embodiment will use this type of treatment process as an example. The spent caustic stream enters vessel 1 through inlet 5 and into the mixing zone 2. The spent caustic is typically comprised of 1 to 10 wt % NaOH, 0 to 4 wt % sulfides and bisulfides, 0 to 4 wt % mercaptides as sulfur, 0 to 4 wt % carbonates as CO3, 0 to 5 wt % cresylic acids. A neutralizing agent is also added to mixing zone 2 preferably by adding it directly to the waste stream upstream of inlet 5. Optionally, a mixing device (not shown), such as an in-line static mixer can be used to premix the caustic and neutralizing agent. The amount of neutralizing agent added can be controlled by any means known to the art, however, a convenient method, as shown in the FIGURE, is to use a pH monitor 12 to measure the pH of the solution in mixing zone 2 and compare it with the pH of the solution in settling zone 3. If the pH is higher than desired, then more neutralizing agent is added to mixing zone 2.

Inside mixing zone 2 is at least one means for thoroughly mixing the waste stream and neutralizing agent. When spent caustic is the waste stream to be treated, then a preferred neutralizing agent is a strong acid, such as, sulfuric acid, however, other acids could be used, such as, hydrochloric acid. The amount of neutralizing agent mixed with the waste stream is selected so that it significantly lowers the Ph of the solution so as to facilitate impurity removal by physical means. Preferably, when sulfuric acid is used it is added directly to the spent caustic stream upstream of inlet 5. As shown in the FIGURE, an impeller type mixer is a preferred mixing means, however, other mixing means known to the art may be used, for example, a gas sparger. The residence time in mixing zone 2 is selected so as to properly mix the acid specified so that the Ph is uniform and the reactions required are 100% achieved. To the extent any volatile hydrocarbons or other gaseous compounds are present in the waste stream they will be removed via off-gas outlet 21 using a sweep gas as described below.

A portion of the mixture from zone 2 is continuously removed via down corner 8 and fed into settling zone 3. This zone allows for the separation of organics from the aqueous components using any known mechanical separation apparatus, for example, the baffles shown in the FIGURE. Since the organic phase is less dense than the aqueous phase, it can be decanted and removed from vessel 1 via organic outlet 9. When spent caustic is the waste stream being treated, the organic phase consists primarily of acid oils, such as naphthenic acids, DSO, cresylic acids, or entrained hydrocarbon. The aqueous phase in settling zone 3 consists primarily of an acidic brine containing sodium salts and is removed via line 10 and introduced into the top of mass transfer zone 4 where acid gases are stripped out of the brine with an inert gas such as nitrogen. Mass transfer zone 4 can contain any number of known packing materials or design of trays to aid in the stripping of the acidic brine from the aqueous solution. An inert gas, such as nitrogen, is added via inlet 18 to the bottom of mass transfer zone 4 where it flows counter current to the aqueous phase. The inert gas is used to strip $H_2S$, $CO_2$ and other gases from the aqueous phase and is then removed via line 19 where it is used as a sweep gas in the top portion of the settling zone 3 and then is removed via line 20. The sweep gas in line 20 is introduced to the top of the mixing zone 1 and eventually is removed from vessel 1 via off-gas outlet 21.

After being stripped of acid gases the aqueous phase is removed from vessel 1 via line 11 and ultimately from the process via line 14 where it can be disposed of using known methods. Alternatively, as shown in the FIGURE, a portion of the aqueous phase in line 11 is recycled with the aid of pump 13 via line 15 back to mass transfer zone 4. When a portion of the aqueous phase is recycled it is desirable to add a second neutralizing agent, such as NaOH or KOH, through line 16 followed by contact in a mixing means, such as an in-line static mixture 17 as shown in the figure. To control the addition of the second neutralizing agent, in-line pH meters can be used to monitor the pH of the aqueous phase exiting mass transfer zone 4 via line 11 and then comparing it with the pH in the recycle stream downstream of the mixing means 17.

Operating temperatures for vessel 1 range from about 80° C. to about 130° C., more preferably from about 90° C. to about 110° C. The internal pressure of vessel 1 can range from about 3 atmospheres to about 10 atmospheres gauge.

The foregoing description of the specific embodiments will so fully reveal the general nature of the invention that others can, by applying current knowledge, readily modify and/or adapt for various application such specific embodiments without departing from the generic concept, and therefore such adaptations and modifications are intended to be comprehended within the meaning and range of equivalents of the disclosed embodiments. It is to be understood that the phraseology or terminology herein is for the purpose of description and not of limitation.

The means, materials, and steps for carrying out various disclosed functions may take a variety of alternative forms without departing from the invention. Thus, the expressions "means to . . . " and "means for . . . ", or any method step language as may be found in the specification above or the claims below, followed by a functional statement, are intended to define and cover whatever structural, physical, chemical or electrical element or structure, or whatever method step, which may now or in the future exist which carries out the recited function, whether or not precisely equivalent to the embodiment or embodiments disclosed in the specification above, i.e., other means or steps for carrying out the same function can be used; and it is intended that such expressions be given their broadest interpretation within the terms of the following claims.

We claim:

1. An integrated treatment vessel for treating waste streams comprising, in combination,
    a vertical column having an interior divided into at least a mixing zone, a settling zone, and a mass transfer zone;
    a waste stream inlet in liquid communication with the mixing zone;
    an off gas outlet in communication with the mixing zone;
    an organic stream outlet in liquid communication with the settling zone,
    wherein the settling zone has one or more baffles to assist in a separation of aqueous and organic phases;
    a liquid transfer line connecting the settling zone with the mass transfer zone;
    a vapor line connecting the mass transfer zone to the settling zone;
    an inert gas inlet in communication with the mass transfer zone; and
    a treated waste stream outlet in liquid communication with the mass transfer zone.

2. The integrated treatment vessel of claim 1 further characterized in that the waste stream inlet is in liquid communication with a neutralization line.

3. The integrated treatment vessel of claim 1 further characterized in that the mixing zone has a means for mixing liquid introduced into the mixing zone through the waste stream inlet.

4. The integrated treatment vessel of claim 3 further characterized in that the mixing means is selected from the group consisting of a powered impeller, a gas sparger, a static mixer and combinations thereof.

5. The integrated treatment vessel of claim 1 further characterized in that at least one pH sensor is in communication with the mixing and settling zones in order to assist in controlling addition of neutralization liquid through a neutralization line and into the waste stream inlet.

6. The integrated treatment vessel of claim 1 further characterized in that the mass transfer zone is configured as a stripping column.

7. The integrated treatment vessel of claim 1 further characterized in that the mass transfer zone comprises packing material or one or more trays.

8. The integrated treatment vessel of claim 1 further characterized in that the mass transfer zone has a recycle stream inlet to allow return of a slipstream of treated waste removed from the treated waste stream outlet.

* * * * *